Aug. 8, 1961 G. COCHARO 2,995,318
OPTICAL DATA TRANSFER SYSTEM
Filed April 26, 1957 4 Sheets-Sheet 2

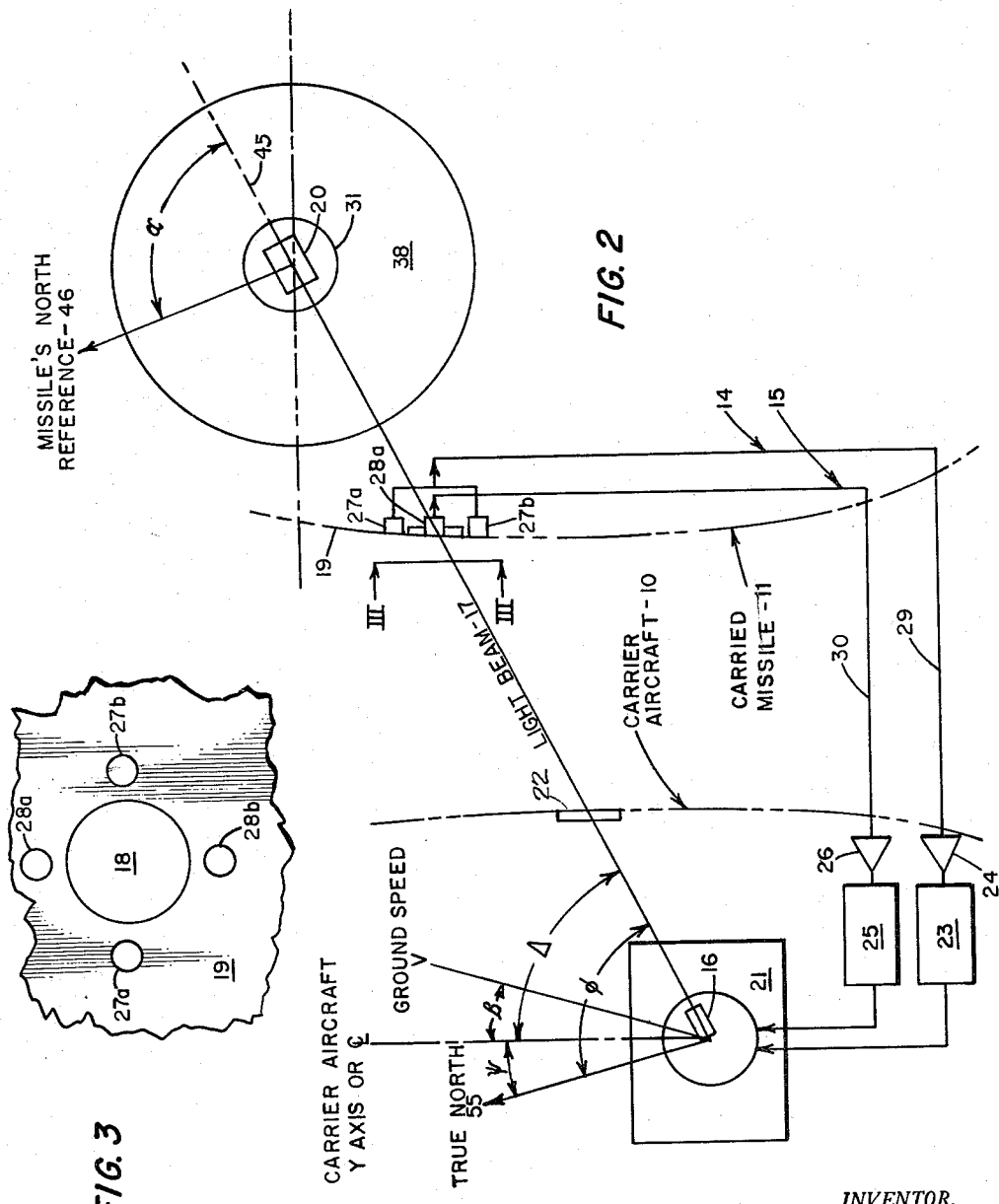

INVENTOR.
Grayson Cocharo
BY
J. H. Nichols
AGENT

Aug. 8, 1961      G. COCHARO      2,995,318
OPTICAL DATA TRANSFER SYSTEM
Filed April 26, 1957      4 Sheets—Sheet 3
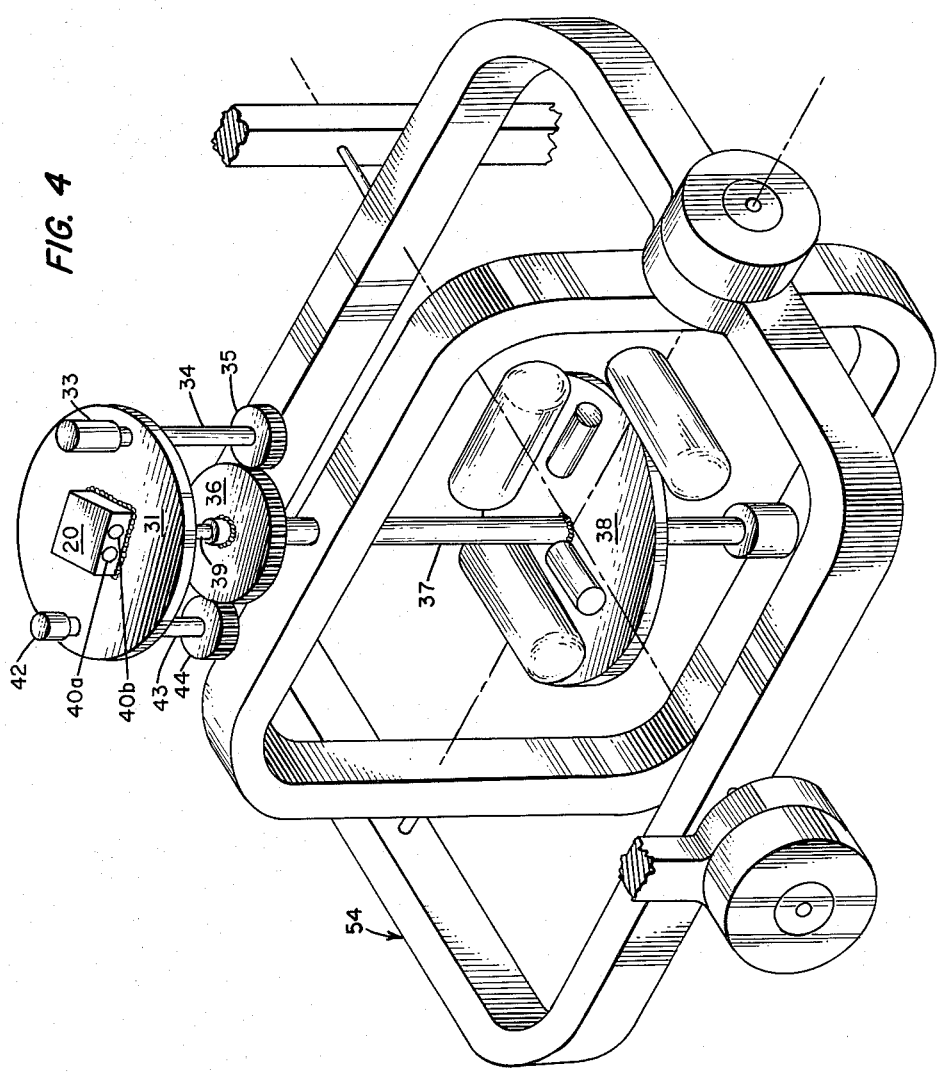
INVENTOR.
Grayson Cocharo
BY
*J. H. Nichols*
AGENT INVENTOR.
Grayson Cocharo
BY
T. H. Nichols
AGENT 2,995,318
OPTICAL DATA TRANSFER SYSTEM
Grayson Cocharo, Arlington, Tex., assignor to Chance Vought Corporation, a corporation of Delaware
Filed Apr. 26, 1957, Ser. No. 656,998
12 Claims. (Cl. 244—14)

This application is a continuing application relative to the subject matter of my prior application "Optical Data Transfer System," Serial No. 636,209, filed January 24, 1957, now abandoned.

This invention pertains to a system for aligning a reference line of an electromechanical instrument mounted in one vehicle or body with a known reference line from a reference data source mounted on a platform near by or in a second body, the system being operative to eliminate the deleterious effects of relative movement between the instrument and the reference data source.

This invention may be used in a "reflex retaliation" operational system in which missiles, as air-to-surface guided missiles, and carrier aircraft for carrying the missiles are brought from a ground stored or aircraft carrier based position to an alert status from which aircraft take-off can be performed immediately upon attachment of the missiles to the missile-carrier aircraft, and subsequent to aircraft take-off, and prior to missile launch from the aircraft the inertial navigational system of each missile is activated and aligned in flight. Further, this invention may be used in a mechanism operative during relative motion between an aircraft and a pylon-mounted guided missile carried on the aircraft for prelaunch orientation of the inertial stabilized platform of the missile as it is being carried by its carrier aircraft. The inertial platform is gravity erected and with the aid of optical components in the missile and in the aircraft's fuselage it may be aligned in azimuth independent of the missile-carrier aircraft's position and attitude and independent of relative vibrational motion between the carried missile and the carrier airplane fuselage. The invention provides, for example, a means for aligning the missile's stabilized platform with true north, or for monitoring from the carrier aircraft the alignment of the missile's platform when it is aligned by any other means, and provides for insertion of ground speed data of the carrier aircraft, and accordingly that of the missile into the missile's inertial navigator prior to launch of the missile from the missile-carrier aircraft.

Likewise, besides being useful between an aircraft and a missile being carried thereby, this optical data transfer system is usable for aligning the missile's inertial stabilized platform prior to missile launch from a land base or from a ship at sea, as an aircraft carrier, a submarine, or the like, wherein the known reference, as an astrocompass for example, is land-based or ship-based. Also this optical data transfer system may be utilized between a tanker aircraft and a missile wherein the missile is mounted on an airplane being refueled from the tanker aircraft.

Heretofore, in air-to-ground missiles which were carried aloft by a missile-carrier aircraft, carried some distance, and then launched, the missile's inertial navigation system was set in operation and aligned with true north as by a reference azimuth direction from an astrocompass, by means of gyrocompassing, other optical systems, etc., on the ground or shipboard prior to the time the missile and its carrier aircraft left the ground, and accordingly the missile platform's azimuth alignment accuracy at the instant of launch from the carrier aircraft was subject to the amount of azimuth gyro drift (rate uncertainty) resulting from the lapse of time from the instant the navigation system was placed in operation on the ground until missile launch. Accordingly, it is necessary to align the missile's platform with true north just prior to launch from the carrier aircraft to gain maximum missile delivery accuracy. An obvious solution is to mount an astrocompass on each missile inertial platform. Two principal disadvantages of this method are the high weight penalty paid for carrying an astrocompass on each missile inertial platform and the higher cost of such a stellar inertial system per se that would be expended with each missile.

If the astrocompass is positioned in the carrier aircraft and synchros used to align the missile's inertial platform with the true north, the resulting alignment is too far in error and too inaccurate to be acceptable due to the constant changing relative motion between the wing mounted missile and its carrier aircraft. The same inaccuracy results in alignment of the missile's platform as the missile rests on the deck of a ship. Applicant's invention, an optical data transfer system, provides for the use principally of a light beam projected on the missile from the carrier aircraft in addition to an astrocompass, or the like, permanently mounted in the carrier aircraft for alignment of the missile platform with the true north reference provided by the astrocompass.

In addition, further navigational information, such as the ground speed of the carrier aircraft which is also the ground speed of the carried missile is supplied continuously to the missile's navigator prior to launch from the carrier aircraft over the disclosed optical data transfer system for improving the accuracy of the missile's inertial navigation system.

A principal object of the invention is to provide an optical data transfer system operative independently of any relative motion existing between an electromechanical instrument on a body and a reference data source platform on another body for optical transmission of data from the reference data source to the instrument.

Another object of the invention is to provide an optical data transfer system which during alignment of an electromechanical instrument on a body with a reference platform having a reference line in another body, obviates the deleterious effects of the constantly changing relative motion due to flexure and vibration in the non-rigid structure between the instrument and its body and between the platform and its body.

Another object of this invention is to provide an optical data transfer system operable independently of any relative motion between a first body and a second body for aligning the north reference of the second body with the true north reference provided in the first body.

A still further object of this invention is to provide an optical data transfer system operable independently of relative motion between a first vehicle and a second vehicle for transmitting navigational data from the first vehicle to the second vehicle.

Another object of this invention is to provide a light source servo loop in an optical data transfer system for alignment of an electromechanical instrument on a body with a reference axis in a reference data source platform.

Another object of this invention is to provide an optical head servo loop in an optical data transfer system between a reference data source platform on a body and an instrument mounted on another body.

Yet another object of this invention is to provide a method for transmitting ground speed information from one vehicle to another vehicle.

Another object of this invention is to provide a method for monitoring the alignment of an instrument in one body with a reference source in another body.

Another object of this invention is to provide a method for optical alignment of a first reference of an instrument mounted on a body with a second reference provided by a reference data source platform.

A still further object of this invention is to provide a method for alignment of the north reference of an inertial stabilized platform mounted in a body with a true north reference provided by gyrocompassing the stabilized platform.

Another object of this invention is to provide a monitor or positive indication in a first body of the progress of alignment of an electromechanical instrument in an adjacent second body with a reference line in the first body when utilizing any means of alignment and to provide a positive indication when the instrument is completely aligned.

Another object of this invention is to provide an optical data transfer system for alignment of any number of electromechanical instruments in an aircraft, missile, land vehicle, or on the ground relative to a common line therein whereby the angular relationship of one instrument to another instrument is accurately ascertainable.

Other objects of the invention and the various advantages and characteristics of the disclosed optical data transfer system will be apparent from the following detailed description together with the accompanying drawings, submitted for purposes of illustration only and not intended to define the scope of the invention, reference being had for that purpose to the subjoined claims.

Briefly, one embodiment of this invention comprises a servo driven light source mounted in a missile-carrier aircraft for projecting a light beam to a wing mounted carried missile. The light beam between the missile and the aircraft closes one control loop for maintaining the light beam fixed on an optical detector head in the missile, and the light source closes another control loop in the missile for maintaining the optical detector head locked on the light beam. These light source control loops are used to transmit velocity data from the carrier aircraft to the missile's inertial navigator. Further, the optical data transfer system provides two methods for alignment of the missile's inertial platform with true north, one method being the nulling of the difference between the angle in the carrier aircraft made by the true north line with the light beam and the angle in the missile made by the missile's north reference line with the same light beam, and the other being a system for the nulling of the earth rate component along the east platform axis.

By locking the optical detector head to the missile's inertial stabilized platform such that turning of the head is controlled by the inertial navigator, monitoring of the alignment of the stabilized platform is provided and any error therein results in the detector head being deviated from the light beam. The measurement of this deviation provides a positive indication of the amount of misalignment still in the stabilized platform.

For a better understanding of the invention, reference may be had to the following description taken in connection with the accompanying drawings in which:

FIG. 2 is a schematic plan view of the optical data transfer system;

FIG. 3 is a view showing the missile window and coarse eyes taken at 3—3 on FIG. 2;

FIG. 4 is a detailed and perspective view of the conventional three-axis gimbal stabilized platform of FIG. 2 with the new optical head and its platform mounted thereon.

The invention disclosed herein is not limited in its application to the details of construction and arrangement of parts illustrated in the accompanying drawings, since the invention is capable of other embodiments and of being practiced or carried out in various other ways. Also it is to be understood that the phraseology or terminology employed herein is for the purpose of description and not of limitation.

The disclosed optical data transfer system may be used in various applications between any two vehicles, such as but not limited to the following examples, as between two land vehicles, between an aircraft and a missile carried by another aircraft as between a tanker aircraft and a missile being carried by the second aircraft nearby and connected thereto for refueling, between a ship and a missile being carried thereby, between two ships, etc., or in industrial applications.

This optical data transfer system is very valuable in industrial applications whether used in the field or in the shop, where alignment in the original installation of various electromechanical instruments in the shop requires a high accuracy. Types of instruments, on aircraft for example, that are often required to be aligned accurately in the aircraft manufacturing shop relative to the aircraft longitudinal center line are flight control instruments such as Mach controllers, gyro references, etc., fire control instruments such as optical sights, radar antennas, etc., and navigational instruments such as doppler radar antennas, stabilized platforms, etc.

Carrier aircraft and carried missile

Figure 1:
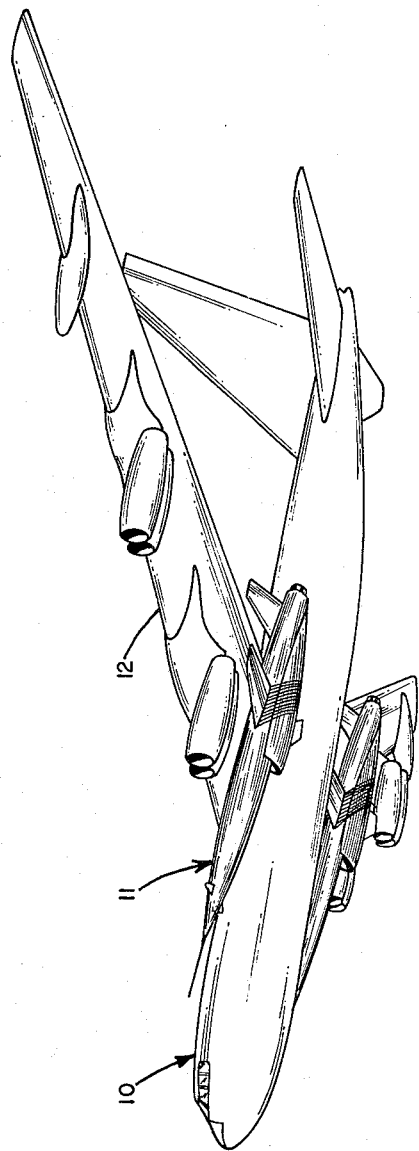
FIG. 1 is a perspective view of a typical missile-carrier aircraft with a typical carried guided missile mounted on the flexible wing of the carrier aircraft wherein the optical data transfer system is utilized to transmit information from the fuselage of the carrier aircraft to the carried missile prior to launch of the missile.

While the disclosed optical data transfer system may be used in various other applications, it is described herein principally as applied to a missile-carrier aircraft 10, FIG. 1, and a carried guided aircraft, wing or body mounted, or missile 11 detachably connected to the carrier aircraft. When a missile, such as an air-to-surface missile, is carried on the wing 12 of a carrier aircraft, intermittent or continuous relative movement exists between the missile and the carrier aircraft's fuselage 13 (FIG. 1) during flight due to bending of the aircraft's wing, vibrations in the wing and pylon mountings, etc. This relative movement makes impossible the alignment with any degree of accuracy of the missile's inertial stabilized platform through a direct connection from a know reference in the carrier aircraft, as for example the true north reference line provided by an astrocompass permanently mounted for taking star sights from the top of the carrier aircraft.

Light source servo loop—coarse eye system

Two servo loops, FIG. 2, an azimuth light source servo loop 14 and an elevation light source servo loop 15 are provided for maintaining a narrow beam of light 17 from a light source 16 in the carrier aircraft constantly directed at the midpoint position or center of a window 18 in the skin 19 of the carried missile regardless of relative movement of the missile with respect to the carrier aircraft. Behind the window and in line with the light beam 17 is mounted an optical detector head 20 described hereinafter.

The light source 16 is universally mounted on a reference data or optical source platform 21 fixed in the fuselage 13 (FIG. 1) of the carrier aircraft for projecting the beam of light 17 through a window 22 in the side of the carrier aircraft and into the wing mounted missile through the window 18 in the side of the missile. This universal mounting and movement of the light source 16 is required because of the up and down and to and fro movement of the wing mounted missile relative to the carrier aircraft's fuselage 13 (FIG. 1) due to bending of the aircraft's wing 12. Movement of the light beam 17 in azimuth, i.e. transverse sweep of the beam in substantially a horizontal plane, is provided by a servomotor and gear train 23 and servoamplifier 24 of the azimuth light source servo loop 14, and movement of the light beam in elevation, i.e., sweep in a substantially vertical plane, is provided by a sevomotor and gear train 25 and servoamplifier 26 of the elevation light source servo loop 15. In each of the above servo loops, the light beam 17 completes the loop.

In the missile and around its window 18 are positioned azimuth coarse eyes or precision beam detectors 27a and 27b of the azimuth light source servo loop system 14 and elevation coarse eyes or precision beam detectors 28a and 28b of the elevation light source servo loop system 15. Both pairs of coarse eyes are conventional detectors, such as phototransistor detectors which produce a voltage proportional to the angle of incidence or the angle subtended from the light beam 17 whereby an error signal is provided to control the light source 16 in both azimuth and elevation, similar to the coarse eyes disclosed in "The Review of Scientific Instruments," vol. 27, number 4, April 1956, pages 216–218.

The azimuth light source servo loop 14 is completed with a detachable electrical connection 29 between the azimuth beam detectors 27a, 27b and the azimuth servo-amplifier 24 for transmission of error signals for controlling movement of the light beam 17 in azimuth, and the elevation light source servo loop 15 is completed with a detachable electrical connection 30 between the elevation beam detectors 28a, 28b and the elevation servo-amplifier 26 for transmission of error signals for controlling movement of the light beam in elevation.

Accordingly, as the light passes from the light source in the fuselage of the carrier aircraft to the missile beam detectors, any movement of the light beam from the illustrated midpoint position or center of both the azimuth beam detectors and the elevation beam detectors due to transverse and vertical movement of the wing mounted missile relative to the carrier aircraft's fuselage is detected by the corresponding azimuth and elevation beam detectors and error signals are transmitted in the azimuth and elevation light source servo loops, respectively, to their corresponding optical source platform servomotors for controlling and moving the light source until the corresponding error signals are nulled or balanced.

Further, in aligning an electromechanical instrument for industrial purposes, the azimuth and elevation error signals may be nulled by manually turning the reference data source platform until the light source is incident on the fine eye detector.

*Optical head servo loop—fine eye system*

Figure 5:
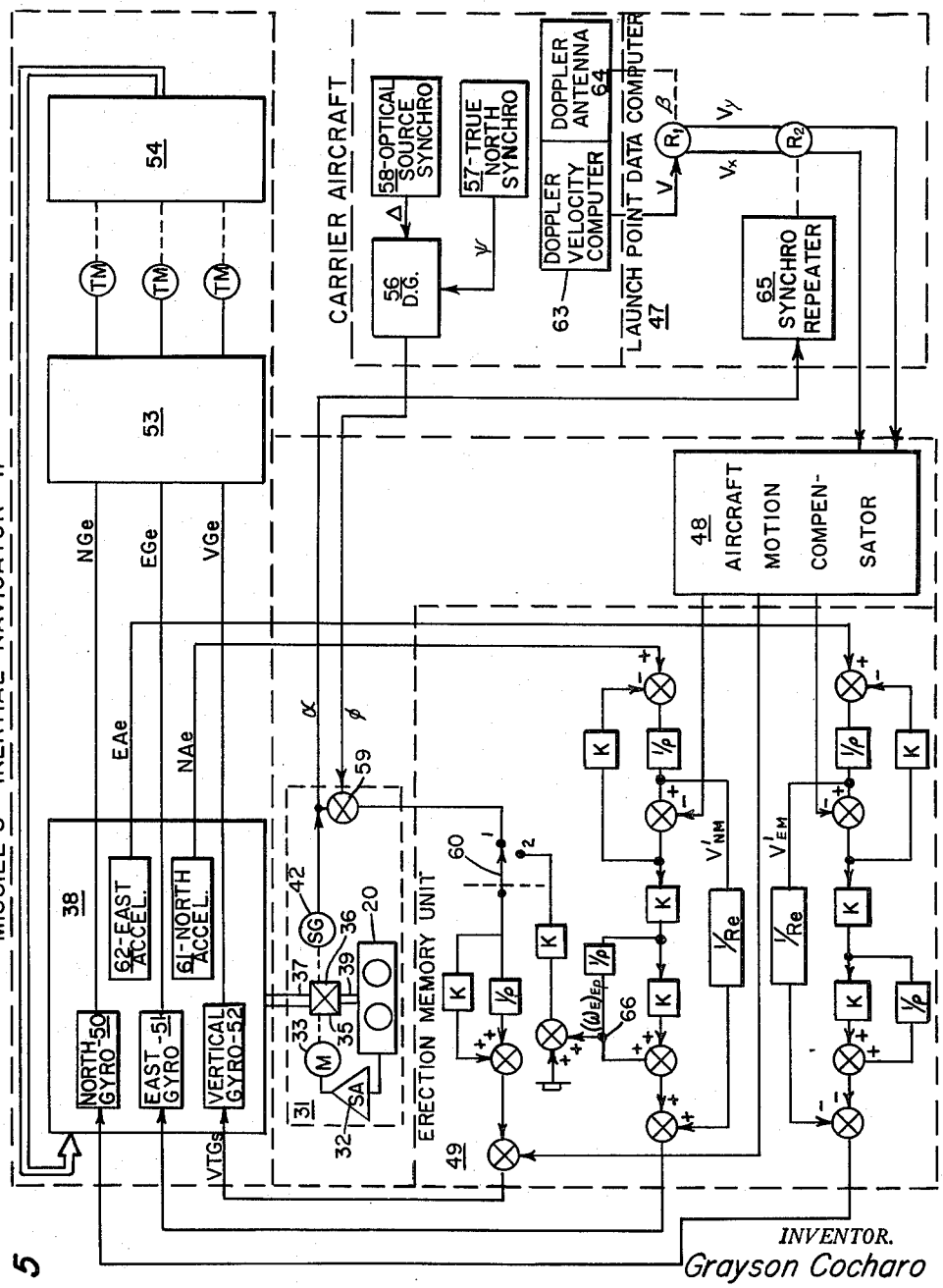
FIG. 5 is a schematic view of the circuits involved in the optical data transfer system as utilized with a conventional missile inertial navigator.

An optical head servo loop, FIG. 5, is utilized for maintaining the rotatable optical detector head 20, FIGS. 2, 4 and 5, locked on the light beam 17 passing through the center or midpoint position of the coarse eyes from the carrier aircraft. This optical head servo loop, FIG. 4, comprises the detector head 20 fixedly mounted on an optical platform 31, a servoamplifier 32, FIG. 5, and an optical platform servo torque motor 33 having a gear 35 on its shaft 34 and in mesh with a gear 36 on a shaft 37 (said gears and shafts being shown in FIG. 4) fixed to the missile's inertial stabilized platform 38 for rotating the detector head until its output signal is nulled and at which time the detector head is in alignment with the light beam 17. As shown in FIG. 4, the optical detector head 20 is fixedly mounted, as by welding or the like, on the optical platform 31 which in turn is mounted on a shaft 39 rotatably mounted in the shaft 37 of the missile's platform.

The optical detector head 20 itself is an extremely photosensitive azimuth detector or sensor. The azimuth detector consists of an assembly of two photo tube cartridges or fine eyes 40a and 40b for detecting any misalignment between the beam of parallel light 17 and the axis 45 of the optical detector head similar to that disclosed in the foregoing identified publication. An exemplary fine eye comprises an objective lens, a fine knife edge at the focal point of the objective lens, an optical diffuser, and a photosensitive element such as an RCA–1 P42 photo tube, a Western Electric 1740 photo transistor, etc. Angular rotation of a fine eye relative to the incident parallel light beam and normal to the knife edge varies the light incident on the photo tube or transistor from no light to maximum light and provides a voltage proportional to the angle between the light beam projected on the face of the detector head and a line normal to the face. Obviously angular motion parallel to the knife edge does not affect the output as only the sensitivity of the eyes is reduced. With the two fine eyes connected to give push-pull signals, the optical head is locked on the light beam in precise alignment therewith when the error is nulled in the optical head servo loop.

At the start of operation, the optical platform 31 undergoes an azimuth search by its motor 33 until light beam 17 is incident on the photo-sensitive fine eyes 40a, 40b of the optical detector head 20. Thereafter, the detector head is driven such that it is locked on the light beam from the carrier aircraft. Accordingly when the detector head 20 is out of alignment with the light beam 17, an error signal is sent to the servo amplifier and optical platform servo torque motor 33 for rotating the optical platform 31 in the proper direction relative to the light beam and also the stabilized platform 38 and its gear 36 until the optical detector head is aligned with the light beam, i.e., the two fine eye signals are balanced.

Likewise, in aligning an electromechanical instrument for industrial purposes, the azimuth error signals may be nulled by manually turning or rotating the detector head platform until the detector is in alignment with the light beam.

*Transmission of velocity data*

The optical data transfer system may be utilized, as illustrated in the electrical diagram of FIG. 5, to transmit signals proportional to the ground speed from a suitable velocity source such as a Doppler velocity computer 63 in the carrier aircraft 10 to the missile's inertial navigator 41.

On the missile's optical platform 31, FIG. 4, is a synchro 42, or the like, having a shaft 43 carrying a gear 44 in mesh with the missile's platform gear 36 for measuring any relative movement between the optical platform and the missile's platform 38, and accordingly the angle $\alpha$, FIG. 2, between the axis 45 of the optical detector head and the north reference 46 of the missile's inertial stabilized platform. Angle $\alpha$ is repeated by a synchro repeater 65, or the like, in the launch point data computer 47, FIG. 5, of the carrier aircraft. The inputs to a resolver $R_1$, such as but not limited to model R–230–2 of the Kearfort Company, Inc., of Clifton, New Jersey, are signals proportional to the magnitude of the ground speed V, FIG. 2, from the Doppler velocity computer, and a resolver shaft rotation proportional to the angular displacement, angle $\beta$, of the ground speed vector V from the aircraft centerline or Y-axis as provided by a suitable Doppler antenna 64. The outputs of resolver $R_1$ are signals proportional to the components $V_x$, $V_y$ of the ground speed V along the aircraft X and Y axes. These outputs are supplied as inputs to a second resolver $R_2$, similar to the above described resolver $R_1$, but whose shaft is rotated through the angle $\alpha$ from the synchro repeater 65 to resolve these X and Y velocity components into signals proportional to the ground speed components along the north and east platform axes for transmission to the missile's inertial navigator. Accordingly, the ground speed components compatible with the missile's inertial navigator 41 are transmitted from the carrier aircraft 10 to the inertial navigator of the wing carried missile utilizing the disclosed optical data transfer system.

In this exemplary inertial navigator, the north and east ground speed components are transmitted to the aircraft motion compensator 48 and erection memory unit 49, of the inertial navigator. The resultant ground speed information is utilized in the above units for providing velocity damping and gravity and coriolis corrections, etc., in the missile's inertial navigation system.

Another method for transferring velocity or position data from a reference data system to a remote inertial system which is being aligned includes sole use of a coded optical beam, per se. In this method, the light beam is chopped at a controlled frequency, as 10,000 cycles per second for example, and modulated to carry the velocity or position intelligence. This method accordingly eliminates the interconnecting electrical cables between the reference data system and the remote inertial system.

*Inertial platform control loop*

FIG. 5 illustrates a conventional inertial navigator 41 such as but not limited to the inertial navigator disclosed in "Theoretical Background of Inertial Guidance Systems," March 1950, W. Wrigley, Massachusetts Institute of Technology Instrumentation Laboratory, pages 35–52. An illustrated and pertinent portion of the inertial navigator is the gyroscope stabilized platform 38 having north, east, and vertical gyros 50, 51, and 52, respectively, for providing error signals NG$e$, EG$e$, and VG$e$, respectively, to a flight path reference stabilization computer 53 for generating signals for torque motors, TM for rotation of the platform about its three axes through its gimbal system 54 until the error signals of the gyros are nulled. Additional description of the exemplary gyro-stabilized platform is provided in Patent No. 2,955,474 dated October 11, 1960.

After any length of time the missile's inertial platform 38 will drift out of alignment with the north and east directions or particularly the true north direction due to gyro drifts. To make the platform assume a northeast or true north orientation, an input torquing signal VTG$s$ must be supplied to the vertical gyro 52. This signal may be generated by two different methods provided by the optical data transfer system.

*Intertial platform control loop—optical alignment method*

The disclosed optical data transfer system provides for measuring the angle in the carrier aircraft 10 between a reference line and the light beam 17 and the angle in the carried missile 11 between a reference line and the same light beam. The difference between these corresponding angles is used in the inertial platform control loop to rotate the missile's platform 38 in azimuth until the angles are equal. While the reference lines in the carrier aircraft and missile may be any desired reference lines in which the one in the missile is required to be maintained parallel to the other in the carrier aircraft, I utilize true north, 55, as the reference line in the carrier aircraft as determined and produced by any suitable accurate instrument (not shown), such as by an astrocompass permanently mounted in the carrier aircraft 10 for taking star sights above and the north reference 46 of the missile's inertial guidance system as the reference line in the carried missile 11.

Alignment of the missile's inertial platform 38 with true north may be accomplished by nulling the difference between angle $\phi$, the angular displacement in the carrier aircraft of the light beam from the true north direction, and angle $\alpha$, the angular displacement in the carried missile of the light beam from the missile's north reference as disclosed hereinafter.

The inertial platform control loop, as shown in FIG. 5, comprises a differential generator synchro 56 in the carrier aircraft, such as but not limited to model #245 built by Kearfort Company, Inc. identified above, for receiving a first input signal proportional to angle $\psi$ between the centerline of the carrier aircraft and the true north direction 55, FIG. 2, provided by the true north reference synchro 57 as controlled by the astrocompass in the carrier aircraft, and a second input signal proportional to angle $\Delta$ between the centerline of the carrier aircraft and the light beam 17, FIG. 2, from an optical source synchro 58. The algebraic addition of these inputs $\psi$ and $\Delta$ by the differential generator synchro 56 in the carrier aircraft provides an output signal proportional to angle $\phi$, the azimuth orientation of the light beam from true north.

Signals proportional to both angle $\phi$ from the carrier aircraft's differential generator 56 and angle $\alpha$ from the missile's optical platform synchro 42 are combined in the electronic summing or mixing amplifier 59 and any difference between these two angles is transmitted to the two position switch 60 in the erection memory unit 49 of the missile's inertial navigator. This erection memory unit includes summing amplifiers ⊗, various gain constants $$\boxed{K}$$

integrators $$\boxed{1/p}$$

and computing elements for performing division $$\boxed{1/R_e}$$

etc. The north and east accelerometers, 61 and 62, respectively, measure platform acceleration along the north and east axes with the output signals integrated in the erection memory unit 49 to provide the necessary torquing signals for the platform gyros. With switch 60 in the number one position shown and after appropriate electronic filtering, the output of the erection memory unit is the input torquing signals VTG$s$ to the vertical gyro for torquing the missile's inertial stabilized platform about its vertical axis until the difference between angles $\phi$ and $\alpha$ is nulled, i.e., the output error signal VG$e$ of the vertical gyro on the gyrostabilized platform 38 drives or rotates the platform through its gimbals and torque motors until the output of the gyros is nulled. When angle $\alpha$ is made equal to angle $\phi$, the north reference 46 of the missile's inertial stabilized platform is accordingly parallel to or aligned with the true north 55.

After the missile's inertial platform is aligned and the inertial guidance phase initialed, the transmission of data is completed and accordingly the interconnecting lines shown in FIG. 5 may be separated by pull-away plugs, or the like, at any time at or prior to launch of the missile.

*Inertial platform control loop—gyrocompass alignment method*

Gyrocompassing a stabilized platform is merely causing it to perform the function of a gyrocompass.

In the gyrocompass alignment method, the switch 60 of the erection memory unit 49 is shifted to the number two position, FIG. 5. As described in the above optical alignment method, this optical data transfer system provides for measurement of the angle $\alpha$ between a reference line in the carrier missile 11 and the light beam 17 from the carrier aircraft 10. This angle $\alpha$ is repeated by synchro repeater 65 in the launch point data computer 47 in the carrier aircraft as a shaft rotation in resolver R$_2$ such that signals proportional to the north and east components of the ground speed are generated as described in the transmission of velocity data of the foregoing optical alignment method. Accordingly, the ground speed components compatible with the missile's inertial navigator 41 are transmitted from the carrier aircraft 10 to the inertial navigator of the wing carried missile 11 utilizing the disclosed optical data transfer system.

In this exemplary inertial navigator, the north and east ground speed components are transmitted to the aircraft motion compensator 48 and erection memory unit 49 of the inertial navigator. The resultant ground speed information is utilized in the above units for providing velocity damping and gravity and coriolis corrections, etc., in the missile's inertial navigation system. In accomplishing these functions the component 66, FIG. 5, of the earth's angular velocity along the east platform axis is generated in the erection memory unit 49. Additional description of the earth rate components in the exemplary inertial navigator is provided in assignee's co-pending application identified above. Accordingly, instead of using the difference between angles $\phi$ and $\alpha$ to torque the missile's inertial platform vertical gyro 52, a signal proportional to the component 66 of the angular rate of the earth's rotation about its polar axis along the east platform axis, $(\omega_E)$ $Ep$, is utilized, and as the platform becomes aligned with the north and east axes, the east axis earth rate component is reduced to zero. Therefore the east platform component of the earth rate is used to torque the platform vertical gyro until the east axis earth rate component is reduced to zero in the same manner that the difference in angles $\phi$ and $\alpha$ was utilized in the foregoing optical alignment method in driving the platform 38 around until the error signals were nulled.

*Monitoring*

When utilizing any other means than that disclosed herein for gyrocompassing or azimuth alignment of the missile platform with any desired reference line, the disclosed optical alignment system may be used to monitor the specific alignment or progress of alignment of the missile platform from the carrier aircraft. This feature is accomplished by merely locking the optical head platform 31, FIG. 2, to the missile's inertial platform 38 and subsequently to measure the deviation angle of the optical head axis 45 from the optical line of sight or light beam 17 with the fine eyes 40a and 40b. Accordingly, the output signal of the fine eyes may be transmitted and monitored in the carrier aircraft by means of a voltmeter, for example, calibrated in minutes of arc proportional to the deviation angle. Therefore a positive indication in the carrier aircraft is provided indicating when the missile's inertial platform is completely aligned and hence a positive indication of when the missile can be launched.

Accordingly, an optical data transfer system and method are disclosed for transmission of data between any two vehicles such as for example, between two land vehicles, between a missile and a land base, between a ship and a missile being carried thereby as an aircraft carrier, a submarine, etc., between an aircraft and a missile carried by the aircraft, between one aircraft and a missile carried by another aircraft such as between a tanker aircraft and a missile being carried by the second aircraft connected to the tanker for refueling, etc. Further, during alignment of the missile's inertial platform with the reference data source, this system obviates the deleterious effects of any constantly changing relative movement, however large or small, between the inertial stabilized platform on the missile and the reference data source on the ground, shipboard, or aircraft. As for an industrial application, this optical data transfer system may accordingly be utilized in the shop for alignment of any number of electromechanical instruments relative to a reference line whereby the angular relationship of one instrument to another instrument is accurately ascertainable. This optical data transfer system is shown further to provide for transmission of velocity data from the missile-carrier aircraft or other reference data source to the missile's inertial navigator. Alignment of the missile's inertial platform with true north is accomplished by two methods, a first method including nulling the difference between the angular displacement of the light beam from true north, angle $\phi$ in the missile-carrier aircraft, and the angular displacement of the platform north reference from the same light beam, angle $\alpha$, in the carried missile, and a second method including nulling the earth rate component along the missile's east platform axis. The invention has been shown further to comprise an accurate monitor for providing the progress of alignment of the missile's inertial platform with a reference line in the carrier aircraft or reference data source and as a positive indication of when the inertial platform is completely aligned for launching of the missile from the carrier aircraft, land base, or ship.

While only one embodiment of the invention has been shown in the accompanying drawings, it will be evident that various modifications are possible in the arrangement and construction of the optical data transfer system components without departing from the scope of the invention.

I claim:

1. An optical head servo loop in an optical data transfer system connected between a first body and a second body wherein the two bodies have independent relative motion between each other comprising, a light beam projecting from the first body to the second body, an optical detector means rotatably mounted on the second body in the field of said light beam for rotation about a vertical axis, and servo means for rotating said detector means, said detector means detecting relative movement of said light beam from a predetermined point in said detector means and transmitting error signals proportional to said movement to said servo means, said servo means being responsive to said error signals for rotating said detector means until said error signals are nulled and said detector means is in alignment with said light beam.

2. An optical head servo loop in an optical data transfer system between a reference data source platform on a first body and an instrument mounted on a second body comprising, a light beam projecting from the platform to the second body, an optical detector means rotatably mounted on the second body in the field of said light beam, and servo means for rotating said detector means, said detector means detecting relative movement of said light beam from a predetermined point in said detector means and transmitting error signals proportional to said relative movement to said servo means, said servo means being responsive to said error signals for rotating said detector means until said error signals are nulled and said light beam is incident on said point in said detector means.

3. An optical data transfer system for transmitting ground speed information from a first vehicle to an instrument in a second vehicle independently of any relative motion between the first and second vehicles comprising, an inertial stabilized platform in the instrument having reference line axes and a vertical axis, an optical platform mounted on said instrument for rotation about said vertical axis, a reference line on said stabilized platform and a reference line on said optical platform, means on said optical platform for measuring the angle between said two reference lines, velocity means in the first vehicle for generating signals proportional to the magnitude and direction angle of the first vehicle ground speed vector from the center line of the first vehicle, first resolver means having a shaft, said velocity means providing said first resolver with signals proportional to said magnitude of the ground speed of the first vehicle and a shaft rotation of said first resolver proportional to said direction angle, said first resolver means having an output proportional to the ground speed components along the axes of the first vehicle, a second resolver means having a shaft, and a repeater means for repeating said measured angle as a shaft rotation in said second resolver, said second resolver means being responsive to said first resolver output and to said repeater shaft rotation to provide the instrument in the second vehicle with signals proportional to said ground speed components along said reference line axes of said stabilized platform.

4. An optical data transfer system for a first body and a second body for alignment of the north reference of an inertial stabilized platform having a vertical axis mounted in the second body with a true north reference provided by a true north indicating means in the first body wherein the two bodies have independent relative motion between each other comprising, a light source universally mounted in the first body for projecting a light beam at the second body, an optical detector head rotatably mounted on the stabilized platform, light source servo loop means connected between said light source and the second body for maintaining said light beam directed at said detector head, optical head servo loop means for maintaining said detector head locked on said light beam, a first synchro connected between said detector head and the stabilized platform for providing an output signal proportional to a first angle between the north reference of the stabilized platform and said light beam in the second body, a second synchro connected between the true north indicating means and said light source for providing an output signal proportional to a second angle between the true north reference and said light beam in the first body corresponding to said first angle, a mixing amplifier connected to said first and second synchros for comparing the output signals of said synchros, and torque motors connected to said mixing amplifier and said stabilized platform, said torque motors being responsive to said mixing amplifier to turn the stabilized platform about its vertical axis until the difference between said first angle in the second body and said second angle in the first body is nulled.

5. An optical data transfer system for a first body and a second body for alignment of a first reference of an inertial stabilized platform having a vertical axis mounted in the second body with a second reference provided by a second reference indicating means in the first body wherein the two bodies have independent relative motion between each other comprising, a light source universally mounted on the first body for projecting a light beam at the second body, an optical detector head rotatably mounted on the stabilized platform, light source servo loop means connected between said light source and the second body for maintaining said light beam directed at said detector head, optical head servo loop means for maintaining said detector head locked on said light beam, a first means connected between said detector head and the stabilized platform for providing an output signal proportional to a first angle between the first reference of the stabilized platform and said light beam in the second body, a second means between the second reference indicating means and said light source for providing an output signal proportional to a second angle between the second reference and said light beam in the first body corresponding to said first angle, a third means connected between said first and second means for comparing the output signals of said first and second means, and servo means for turning said stabilized platform about its vertical axis, said servo means being responsive to said third means to turn the stabilized platform until the difference between said first angle in the second body and said second angle in the first body is nulled.

6. An optical data transfer system for a reference data source platform on a first body and an instrument on a second body for alignment of a first reference of the instrument having a vertical axis with a second reference provided by a second reference indicating means in the platform wherein the two bodies have independent relative motion between each other comprising, a light source universally mounted on the platform for projecting the light beam at the instrument, an optical detector head rotatably mounted on the instrument, light source servo loop means connected between said light source and the instrument for maintaining said light beam directed at said detector head, optical head servo loop means for maintaining said detector head locked on said light beam, a first means connected between said detector head and said instrument for providing an output signal proportional to a first angle between the first reference of the instrument and said light beam, a second means between the second reference indicating means and said light source for providing an output signal proportional to a second angle between the second reference and said light beam corresponding to said first angle, a third means connected between said first and second means for comparing the output signals of said first and second means, and servo means for turning said instrument about its vertical axis, said servo means being responsive to said third means to turn the instrument until the difference between said first angle and said second angle is nulled.

7. An optical data transfer system for a first body and a second body operative for alignment of the north reference of an inertial stabilized platform mounted in an instrument means in the second body with true north by means of gyrocompassing the stabilized platform wherein the stabilized platform has north and east axes, a vertical axis, and a vertical gyro, and wherein the platform is rotatable about its vertical axis, the instrument has means adapted for generating a signal proportional to the earth's angular velocity component along the east platform axis from north and east ground speed components supplied thereto, and wherein the first body has longitudinal and transverse axes comprising, a light source universally mounted in the first body for projecting a light beam at the second body, an optical detector head rotatably mounted on the stabilized platform, light source servo loop means connected between said light source and the second body for maintaining said light beam directed at said detector head, optical head servo loop means for maintaining said detector head locked on said light beam, a synchro connected between said detector head and said stabilized platform for providing an output signal proportional to the angle between the north reference of the stabilized platform and said light beam in the second body, first resolver means having a shaft, velocity means in the first body for providing said first resolver means with a signal proportional to the magnitude of the ground speed vector of the first body and for providing a shaft rotation of said first resolver proportional to the direction angle of the said ground speed vector from the center line of the first body, said first resolver means having an output proportional to the ground speed components along the axes of the first body, a second resolver means having a shaft, a repeater means for repeating said first angle as a shaft rotation in said second resolver means, said second resolver means being responsive to said first resolver output and to said repeater shaft rotation to provide the instrument means with a signal input proportional to the ground speed components along the stabilized platform north and east axes, the instrument means generating a signal proportional to the platform east earth rate component responsive to said input signal, the vertical gyro means in the stabilized platform responsive to said east component of the earth's angular velocity to turn the stabilized platform about its vertical axis until said east earth rate component is nulled.

8. An optical data transfer monitoring system for a first body and a second body wherein the second body has an inertial stabilized platform comprising, an optical detector head mounted on the stabilized platform to move therewith, said detector head having an axis, a light source universally mounted in the first body for projecting a light beam at said detector head in the second body, light source servo loop means connected between said light source and said second body for maintaining said light beam projected at said optical detector head, and said detector head having means for measuring the deviation angle between the light beam and the optical head axis.

9. An optical data transfer system for transmitting information from a first vehicle to an instrument in a second vehicle independently of any relative motion between the first and second vehicles comprising, an inertial stabilized platform in the instrument having reference line axes and a vertical axis, an optical platform mounted on said instrument for rotation about said vertical axis, a reference line on said stabilized platform and a reference line on said optical platform, said first vehicle adapted to have means for generating signals proportional to the magnitude and direction angle of the information vector from the center line of the first vehicle, resolver means having a shaft, said resolver means adapted to receive the signals proportional to said magnitude of the information and a shaft rotation proportional to said direction angle, said resolver means providing the instrument in the second vehicle with signals proportional to said information components along said reference line axes of said stabilized platform.

10. An optical data transfer system for a first body and a second body for alignment of a first reference of an inertial stabilized platform having a vertical axis mounted on the second body with a second reference provided by a second reference indicating means on the first body wherein the two bodies have independent relative motion between each other comprising, an optical detector head rotatably mounted on the stabilized platform, a light source means mounted on the first body for projecting a light beam at said detector head, means for maintaining said detector head locked on said light beam, a first means for providing an output signal proportional to a first angle between the first reference of the stabilized platform and said light beam on the second body, a second means for providing an output signal proportional to a second angle between the second reference and said light beam on the first body corresponding to said first angle, a third means for comparing the output signals of said first and second means, and servo means being responsive to said third means to turn the stabilized platform until the difference between said first angle on the second body and said second angle on the first body is nulled.

11. An optical data transfer system for a reference data source platform on a first body and an instrument on a second body operative independently of any relative motion between the platform and the instrument for alignment of a first reference of the instrument having a vertical axis with a second reference provided by a second reference indicating means in the platform comprising, an optical detector head rotatably mounted on the instrument, a light source means for projecting a light beam at said detector head from said body, means for maintaining said detector head locked on said light beam, a first means for providing an output signal proportional to a first angle between the first reference of the instrument and said light beam, a second means for providing an output signal proportional to a second angle between the second reference and said light beam corresponding to said first angle, a third means for comparing the output signals of said first and second means, and servo means being responsive to said third means to turn the instrument until the difference between said first angle and said second angle is nulled.

12. An optical data transfer system for a first body and a second body operative for alignment of the north reference of an inertial stabilized platform mounted in an instrument means in the second body with true north by means of gyrocompassing the stabilized platform wherein the stabilized platform has north and east axes, a vertical axis, and a vertical gyro, and wherein the platform is rotatable about its vertical axis, wherein the instrument has means adapted for generating a signal proportional to the earth's angular velocity component along the east platform axis from north and east ground speed components supplied thereto, and wherein the first body has longitudinal and transverse axes comprising, an optical detector head rotatably mounted on the stabilized platform, a light source for projecting a light beam at the second body from the first body, means for maintaining said detector head locked on said light beam, and a synchro connected between said detector head and said stabilized platform for providing an output signal proportional to the angle between the north reference of the stabilized platform and said light beam in the second body, the instrument means generating a signal proportional to the platform east earth rate component, the vertical gyro means in the stabilized platform being responsive to said east component of the earth's angular velocity to turn the stabilized platform about its vertical axis until said east earth rate component is nulled.

References Cited in the file of this patent

UNITED STATES PATENTS

| | | |
|---|---|---|
| 2,420,159 | Wineman | May 6, 1947 |
| 2,479,309 | Cave-Browne-Cave | Aug. 16, 1949 |